United States Patent
Cai et al.

(10) Patent No.: US 10,997,228 B2
(45) Date of Patent: May 4, 2021

(54) COMPARING TABLES WITH SEMANTIC VECTORS

(71) Applicant: International Business Machines Corporation, Armonk, NY (US)

(72) Inventors: Ke Ke Cai, Beijing (CN); Hong Lei Guo, Beijing (CN); Hamid Reza Motahari Nezhad, San Jose, CA (US); Zhong Su, Beijing (CN); Li Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 367 days.

(21) Appl. No.: 15/794,943

(22) Filed: Oct. 26, 2017

(65) Prior Publication Data

US 2019/0130029 A1 May 2, 2019

(51) Int. Cl.
*G06F 16/35* (2019.01)
*G06F 16/31* (2019.01)
*G06F 16/21* (2019.01)

(52) U.S. Cl.
CPC .......... *G06F 16/353* (2019.01); *G06F 16/213* (2019.01); *G06F 16/316* (2019.01)

(58) Field of Classification Search
None
See application file for complete search history.

(56) References Cited

U.S. PATENT DOCUMENTS

| | | | |
|---|---|---|---|
| 8,326,842 B2 | 12/2012 | Vadlamani et al. | |
| 8,381,092 B2 | 2/2013 | Massand | |
| 8,914,419 B2 | 12/2014 | Gerard et al. | |
| 9,607,039 B2 | 3/2017 | Byron et al. | |
| 2006/0253476 A1* | 11/2006 | Roth | G06F 17/2211 |
| 2011/0106829 A1* | 5/2011 | Pradhan | G06F 16/335 707/765 |
| 2015/0007010 A1* | 1/2015 | Byron | G06F 17/27 715/227 |
| 2015/0026557 A1* | 1/2015 | Byron | G06F 17/246 715/227 |
| 2016/0092557 A1* | 3/2016 | Stojanovic | G06Q 30/02 707/723 |
| 2016/0188569 A1 | 6/2016 | Bohra et al. | |
| 2017/0124217 A1* | 5/2017 | Hassanzadeh | G06F 16/36 |
| 2019/0102437 A1* | 4/2019 | Patthak | G06F 16/2453 |

OTHER PUBLICATIONS

Stefan Klampfl et al. "A Comparison of Two Unsupervised Table Recognition Methods From Digital Scientific Articles," D-Lib Magazine, vol. 20, No. 11/12, Nov./Dec. 2014, 13 pages.

* cited by examiner

*Primary Examiner* — Aleksandr Kerzhner
*Assistant Examiner* — Eddy Cheung
(74) *Attorney, Agent, or Firm* — Intelletek Law Group, PLLC; Gabriel Daniel, Esq.

(57) ABSTRACT

A data processing system identifies a first topic for a first table, identifies a second topic for a second table, collects at least one first table attribute comprising at least one row name for the first table, and collects at least one second table attribute comprising at least one row name for the second table. The at least one semantic vector for the first table is compared with the at least one semantic vector for the second table to identify as related at least one row of the first table and at least one row of the second table. The at least one row of the first table and the at least one row of the second table are provided to a communication device with an identification as related.

20 Claims, 4 Drawing Sheets

Table 1                                                              302

BASE UNIT CHARGES                           BASE UNITS

| Description | Unit of Measure | Year 1 Avg. Base Units | Year 2 Avg. Base Units | Year 3 Avg. Base Units |
|---|---|---|---|---|
| DATA CENTER | | | | |
| Mainframe | MIPS | 30,000 | 33,000 | 36,000 |
| XXX/YYY Servers (Virtual) | Virtual Units | 13,100 | 17,030 | 22,139 |
| XXX/YYY Servers (Physical) | Physical Units | 2,400 | 2,500 | 2,600 |
| III | Processor allocation | 26 | 26 | 26 |
| III DASD | Terabytes (TB) | 129 | 129 | 129 |
| DATABASE | | | | |
| AAA | Per Database Instance | 1,250 | 1,375 | 1,513 |
| BBB SQL | Per Database Instance | 650 | 650 | 650 |
| DBA/ABC | Per Database Instance | 2,050 | 2,050 | 2,050 |

FIG. 3

Table 2 _402_

| Charges by Service Section | Contract Start Qty Yr 1 | Contract Start Qty Yr 2 | Contract Start Qty Yr 3 | Contract Start Qty Yr 4 | Contract Start Qty Yr 5 |
|---|---|---|---|---|---|
| Primary/ Secondary Inputs | | | | | |
| JJJ Server Images | 3,898 | 3,831 | 3,831 | 3,831 | 3,831 |
| XXX Server Images | 601 | 601 | 605 | 611 | 615 |
| YYY Server Images | 2,481 | 2,481 | 2,483 | 2,473 | 2,483 |
| III LPARS | 0 | 0 | 0 | 0 | 0 |
| Middleware Instances | 0 | 0 | 0 | 0 | 0 |
| DBA Instances | 90 | 90 | 90 | 90 | 90 |
| AAA Instances | 775 | 775 | 775 | 775 | 775 |
| SQL Instances | 252 | 248 | 248 | 248 | 248 |
| CCC Instances | 13 | 13 | 13 | 13 | 13 |
| Tier 0 | 0 | 0 | 0 | 0 | 0 |
| Tier 1 | 0 | 0 | 0 | 0 | 0 |
| Tier 2 | 0 | 0 | 0 | 0 | 0 |
| Tier 3 | 0 | 0 | 0 | 0 | 0 |

COMPARING TABLES WITH SEMANTIC VECTORS

BACKGROUND

Technical Field

The present application generally relates to data processing, and more particularly, to methods and systems of identifying semantic relationships between data in tables in electronic documents.

Description of Related Art

Many business reports and technical reports include tables. Tables may include a wide variety of data, including financial information, organizational information, statistical information, and information having other types of relationships. Comparison of data in different tables may be desirable for a number of reasons. The tables may, however, be structured in different forms and sizes, be authored by different individuals, contain different phrases for similar concepts, include ambiguous terms, and be different in other ways.

SUMMARY

According to one or more embodiments, a method comprises identifying a first topic for a first table and identifying a second topic for a second table, collecting, by a data processing system, at least one first table attribute comprising at least one row name for the first table, and collecting, by a data processing system, at least one second table attribute comprising at least one row name for the second table. The at least one first table attribute and the at least one second table attribute are placed in at least one semantic category by a data processing system. The at least one first table attribute is converted, by a data processing system, into at least one semantic vector for the first table, and the at least one second table attribute is converted, by a data processing system, into at least one semantic vector for the second table. The at least one semantic vector for the first table is compared, by a data processing system, with the at least one semantic vector for the second table to identify as related at least one row of the first table and at least one row of the second table. The at least one row of the first table and the at least one row of the second table are provided to a communication device with an identification as related.

According to one or more embodiments, a table analysis system comprises a network adapter configured to receive, from a communication device, a table query and to communicate information associated with the table query to the communication device. At least one processor is arranged and constructed to collect at least one first table attribute comprising at least one row name for a first table; collect at least one second table attribute comprising at least one row name for a second table; convert the at least one first table attribute into at least one semantic vector for the first table and convert the at least one second table attribute into at least one semantic vector for the second table; compare the at least one semantic vector for the first table with the at least one semantic vector for the second table to identify as related at least one row of the first table and at least one row of the second table; and provide, to the communication device, the related at least one row of the first table and at least one row of the second table.

According to one or more embodiments, a computer program product for a table analysis system comprises a computer readable storage medium having program instructions embodied therein, wherein the program instructions are executable by a device to cause the device to: collect at least one first table attribute comprising at least one row name for a first table; collect at least one second table attribute comprising at least one row name for a second table; place the at least one first table attribute and the at least one second table attribute in at least one semantic category of an ontology comprising a plurality of semantic categories; convert the at least one first table attribute into at least one semantic vector for the first table and convert the at least one second table attribute into at least one semantic vector for the second table; compare the at least one semantic vector for the first table with the at least one semantic vector for the second table to identify as related at least one row of the first table and at least one row of the second table; and provide, to the communication device, the related at least one row of the first table and at least one row of the second table.

DETAILED DESCRIPTION

The following describes numerous specific details by way of examples in order to provide a thorough understanding of the relevant teachings. The present teachings may, however, be practiced without such details. In addition, well-known methods, procedures, components, and/or circuitry are described at a relatively high-level, without detail, in order to avoid unnecessarily obscuring aspects of the present teachings.

The one or more embodiments described herein provide an enhancement to comparing tables. Two or more tables may be compared from one or more different documents, such as business reports or technical reports. A form of deep semantic association analysis is performed to identify comparable parts of different tables, such as rows or columns. The tables may be structured in different forms, sizes, and data order, may be authored by different individuals, may contain different phrases for similar concepts, may include ambiguous terms, and may be different in other ways.

Any number of tables may be compared, such as two, three, or more tables. The tables may be part of any number of documents, such as one, two, three, or more documents. The documents may be electronic documents. The documents may be provided with the table query or the tables' locations or identifications may be provided with the table query. The tables and documents may be stored locally or anywhere accessible to a data processing system.

The present application may apply to a system, a method, and/or a computer program product. The computer program product may include a computer readable storage medium or media having computer readable program instructions stored therein for causing a processor to carry out aspects of the present application.

The computer readable storage medium may be a tangible device that retains and stores instructions for use by an instruction execution device. For example, the computer readable storage medium may be, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter situation, the remote computer may be connected to a user's computer through any type of network, including a local area network (LAN) or a wide area network (WAN), or the connection may be made to an external computer (for example, through the Internet using an Internet Service Provider). In some embodiments, electronic circuitry, for example, programmable logic circuitry, field-programmable gate arrays (FPGA), or programmable logic arrays (PLA), may execute the computer readable program instructions by utilizing state information of the computer readable program instructions to characterize the electronic circuitry, in order to perform aspects of the present application Aspects of the present application are described herein with reference to flowchart illustrations and/or block diagrams of methods, apparatus (systems), and computer program products according to one or more embodiments. Each element of a flowchart and/or block diagram may be implemented by computer readable program instructions.

The computer readable program instructions may be provided to a processor of a general purpose computer, special purpose computer, or other programmable data processing apparatus to produce a machine, such that the instructions, which execute, via the processor of the computer or other programmable data processing apparatus, implementations of the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present application. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
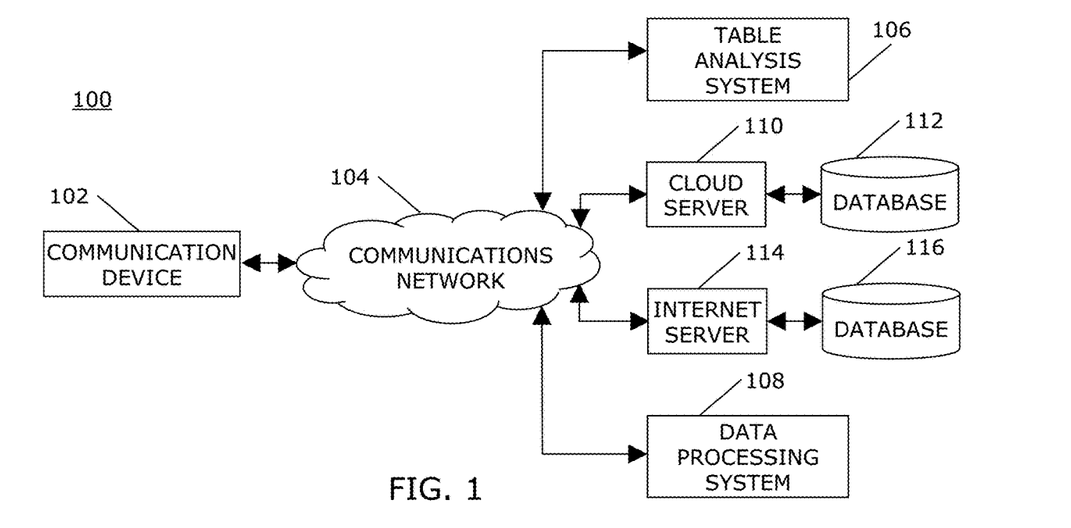
FIG. 1 is a block diagram of a system for comparing tables with semantic vectors in accordance with an exemplary embodiment.

A block diagram of a system 100 for comparing tables is shown in FIG. 1 in accordance with an embodiment. A communication device 102 is typically associated with one or more users. The communication device 102 may be a wireless or wired/wireline, and portable or non-portable. Examples of communication devices 102 include, but are not limited to, cellular phones, smartphones, tablet computers, laptop computers, desktop computers, facsimile machines, wireless organizers, personal digital assistants, pagers, notebook computers, gaming devices, media players, electronic navigation devices, electronic whiteboards, and so forth.

The communications network 104 may be any type of wired, also known as wireline, or wireless network, including, but not limited to, data networks, voice networks, and networks that support both voice and data communications. The communications network 104 may comprise copper wires, optical fibers, wireless transmission, routers, firewalls, switches, gateway computers, and/or edge servers, separately or in any combination. The communications network may include, for example, the Internet, one or more local area networks, and one or more wide area networks.

Figure 2:
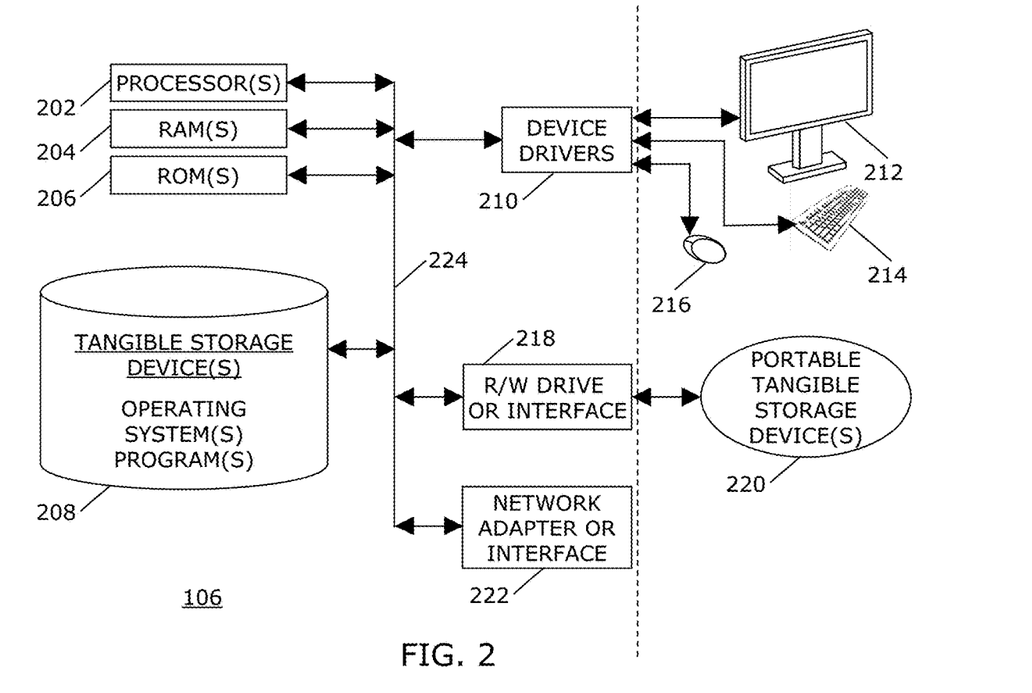
FIG. 2 is a block diagram of a data processing system in accordance with an exemplary embodiment.

A table analysis system 106 for comparing tables with semantic vectors, for example, as described with respect to FIG. 2, is a data processing system that is interfaced with the communications network 104. The table analysis system 106 may be, for example, an IBM Watson® computing system. The system 100 may optionally include another data processing system 108, a cloud server 110, and/or a database 112, and a Internet server 114 and/or a database 116 that the table analysis system 106 may utilize to store or access information for use in analyzing table data. The other data processing system 108 may have a similar structure or architecture as the table analysis system 106.

A block diagram of a data processing system for analyzing table information 106 in accordance with an embodiment is shown in FIG. 2. FIG. 2 provides only an illustration of one implementation and does not imply any limitations with regard to the environments in which different embodiments may be implemented. Many modifications to the depicted embodiment may be made, for example, based on design and implementation specifications.

The system for analyzing table information 106 may be implemented in any electronic device capable of executing machine-readable program instructions, which may be referred to as a data processing system. The system for analyzing table information 106 may be a smart phone, a computer system, PDA, or other electronic devices. Examples of computing systems, environments, and/or configurations in which the system for analyzing table information 106 may be implemented include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The system for analyzing table information 106 may include internal components, to the left of the dashed vertical line, and external components, to the right of the dashed vertical line, as illustrated in FIG. 2. The internal components include one or more processors 202, one or more computer-readable Random Access Memory devices (RAMs) 204, and one or more computer-readable Read Only Memory devices (ROMs) 206, and one or more computer-readable tangible storage devices 208 including one or more operating systems and one or more programs, all communicating over one or more buses 224. The operating system(s) and program(s), such as the program for analyzing table information, are stored on the computer-readable tangible storage device(s) 208 for execution by the processor(s) 202 via the RAM(s) 204, which typically include cache memory. The computer-readable tangible storage device(s) 208 may be, for example, a magnetic disk storage device of an internal hard drive. Alternatively, one or more of the computer-readable tangible storage devices 208 may be a semiconductor storage device such as ROM 206, EPROM, flash memory, or any other computer-readable tangible storage device that stores a computer program and digital information.

The internal components also include a R/W drive or interface 218 that reads from and writes to one or more portable computer-readable tangible storage devices 220 such as a CD-ROM, DVD, memory stick, magnetic tape, magnetic disk, optical disk or semiconductor storage device. The program for analyzing table information may be stored on one or more of the portable computer-readable tangible storage devices 220, read via the R/W drive or interface 218, and loaded into the computer-readable tangible storage device(s) 208.

The internal components may also include network adapters, also known as switch port cards, or interfaces 222 such as a TCP/IP adapter cards, wireless Wi-Fi interface cards, 3G or 4G wireless interface cards, or other wired or wireless communication links. The program for analyzing table information may be downloaded from an external computer, e.g., a server, via the communications network 104 and the network adapters or interfaces 222. From the network adapters or interfaces 222, the program for analyzing table information may be loaded into the tangible storage device 208. For example, the network adapter 222 may be configured to receive, from a communication device 102, a table query and to communicate information associated with the table query to the communication device 102.

The external components may include a computer display monitor 212, a keyboard 214, and a computer mouse 216. The external components may also include touch screens, virtual keyboards, touch pads, pointing devices, and other human interface devices. The internal components also include device drivers 210 that interface to the computer display monitor 212, keyboard 214, and computer mouse 216. The device drivers 210, R/W drive or interface 218, and network adapter or interface 222 are implemented in hardware and software stored in the tangible storage device 208 and/or ROM 206.

Figure 3:
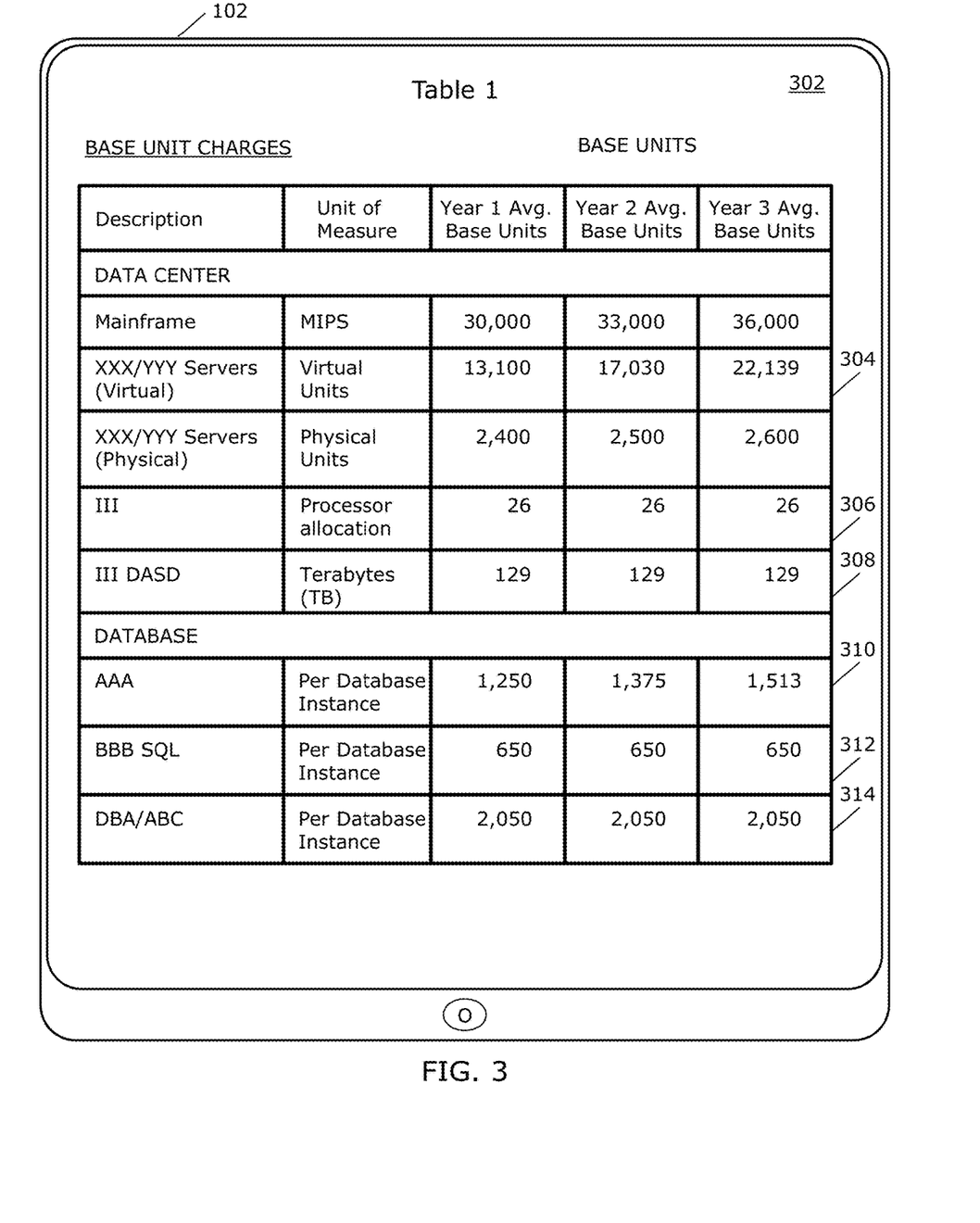
FIG. 3 is a view of a second table displayed on a communication device in accordance with an exemplary embodiment.
Figure 4:
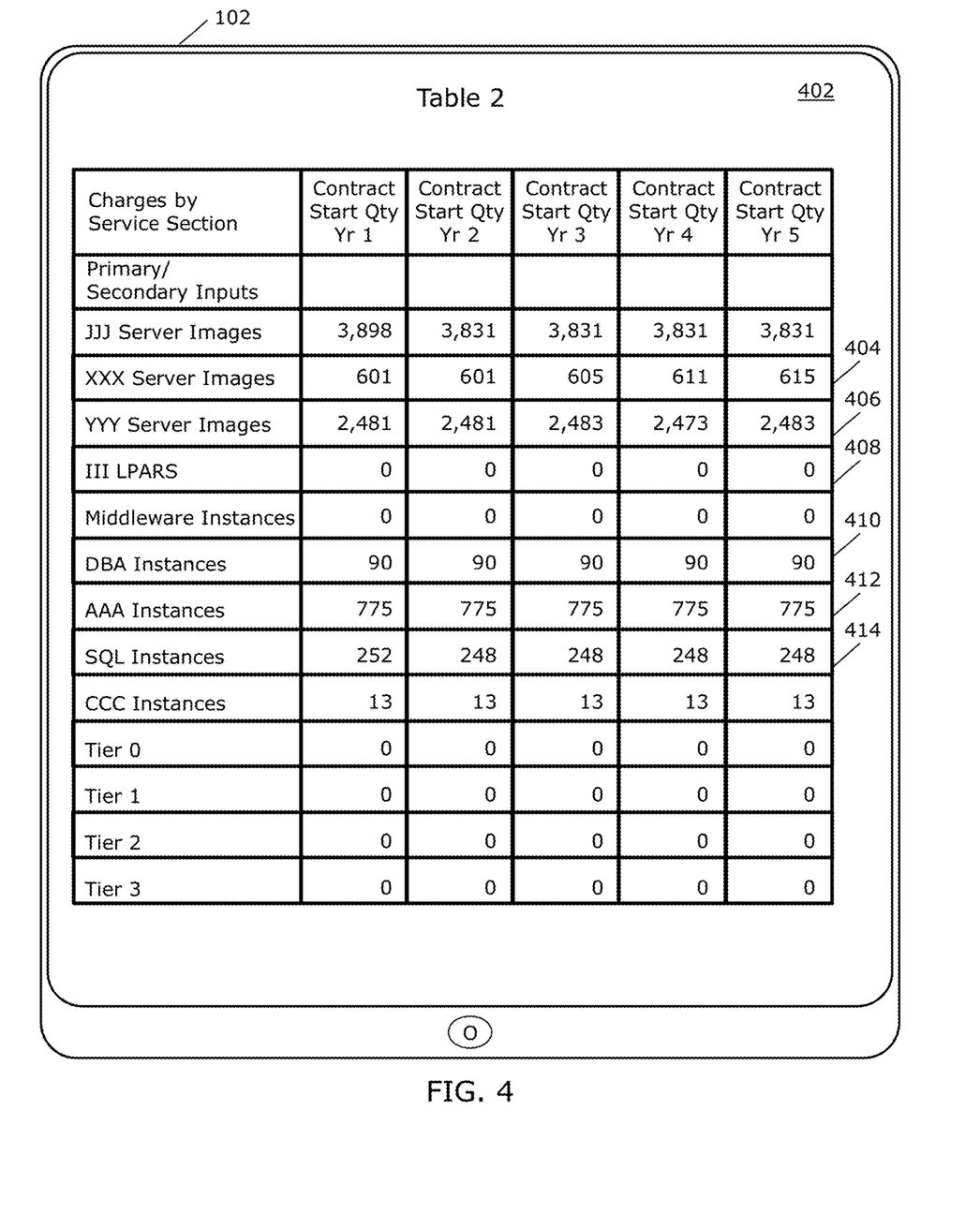
FIG. 4 is a view of a second table displayed on a communication device in accordance with an exemplary embodiment.

Views of tables displayed on a communication device 102 are shown in FIGS. 3 and 4 in accordance with an exemplary embodiment. The user has a communication device 102 that is a tablet computer in this example. The user may utilize the communication device 102 to display Table 1 302, such as shown in FIG. 3, and to display Table 2 402, such as shown in FIG. 4. The user identifies the two or more tables to compare from one or more documents that may electronic documents or document converted into electronic form. A table query is generated to compare the tables and provide the results to the communication device 102 for display and/or storage.

Figure 5:
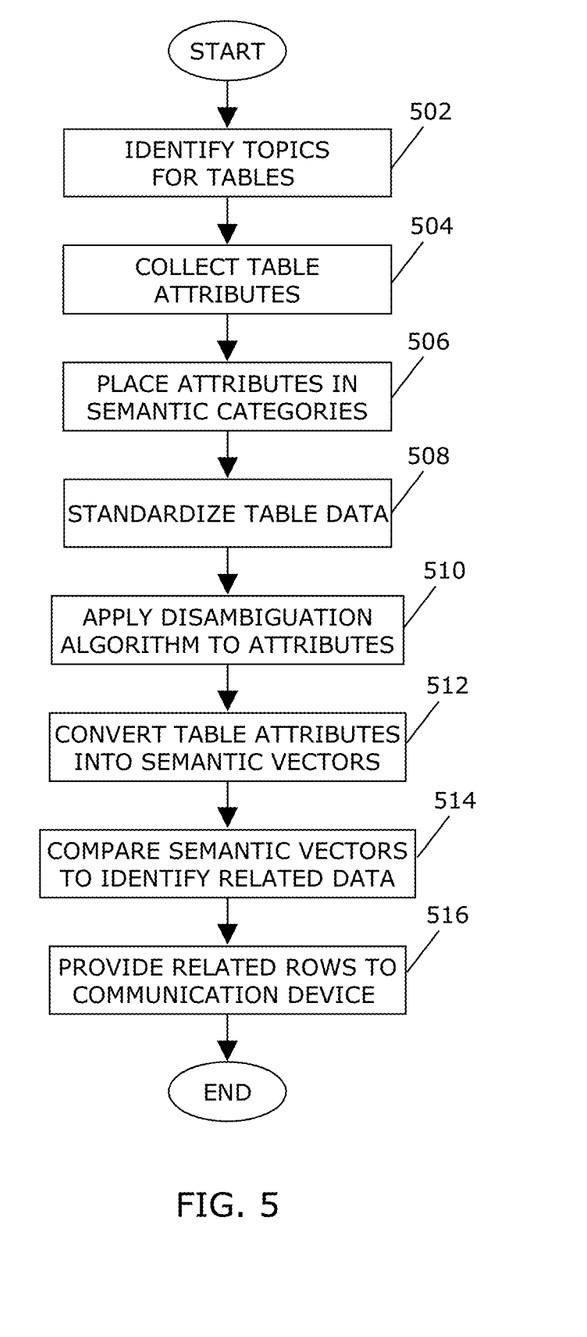
FIG. 5 is a flowchart illustrating a method of analyzing table information in accordance with an exemplary embodiment.

A flowchart illustrating a method of analyzing table information in accordance with an embodiment is shown in FIG. 5. The flowchart is performed by the table analysis system 106 in one or more embodiments. In response to receiving the table query, the system 106 processes and analyzes the table query to identify the tables and perform table analysis. The tables may be at least partially processed prior to receiving a table query, for example, when the tables are stored. Alternatively, some or all of the processing of the tables may be performed in real time, e.g., after receiving the table query.

Although the flowchart of FIG. 5 may be performed on two or more tables from one or more documents, the flowchart will be described by example utilizing Table 1 302 and Table 2 402 as shown in FIG. 3 and FIG. 4. in this example, a client wants an entity to manage many of the client's servers. The client tells the entity, in different tables that are part of different documents, what kind of servers the client has and how many. The table query finds similar data that is provided in different ways in different tables and uses the table analysis system to compare the tables and present the data in one way to the user. At least one topic for each of the tables is identified 502. The topic for a table may be identified from semantic analysis of the title of the table, the table's headers, and other text from the table. Information to identify the topic may also be obtained by performing semantic analysis of text referencing or describing the table from paragraphs within the document containing the table. Possible topics for Table 1 302 include Base Unit and Charges based on the Table 1 contents. An additional topic of Inventory may be obtained from the document including Table 1, which includes the statement, "Inventories may be obtained from the charges shown in Table 1." Possible topics for Table 2 402 include Service based on the Table 2 contents. An additional topic of Maintenance Costs may be obtained from the document including Table 2, which includes the statement, "Maintenance costs for various servers are shown in Table 2."

At least one table attribute is collected 504 for each table. The table attributes may include, for example, at least one row name, at least one column name, and so forth. The table attributes may be obtained by extracting the table's semantic layout structure from the table's rows and columns. Examples of table attributes for Table 1 302 include Mainframe, XXX/YYY Servers (Virtual), XXX/YYY Servers (Physical), III, III DASD, AAA, BBB SQL, and DBA/ABC for rows and Unit of Measure, Year 1 Avg., Year 2 Avg., and Year 3 Avg. for columns. Examples of table attributes for Table 2 402 include JJJ Server Images, XXX Server Images, YYY Server Images, III LPARS, Middleware Instances, DBA Instances, AAA Instances, SQL Instances, CCC Instances, Tier 0, Tier 1, Tier 2, and Tier 3 for rows and Contract Start Qty Yr 1, Contract Start Qty Yr 2, Contract Start Qty Yr 3, Contract Start Qty Yr 4, and Contract Start Qty Yr 5 for columns.

The table attributes are placed in at least one semantic category 504. An ontology includes a structure of concepts or categories within a domain. The ontology is organized by the semantic relationships between the categories and subcategories. Each category and subcategory of the ontology is a semantic category. The ontology may be developed to include a plurality of related semantic categories that are collected over time from data in the domain of the ontology. An example of an ontology for a computer domain is as follows:

+ Software
    – Operating System
        • XXX
        • YYY
        • III
        • JJJ
        • AAA OS
    – Database
        • AAA
        • BBB
        • CCC
        • DBA
+ Hardware
    – Keyboard
        • Wired
        • Wireless
    – Screen
    – Memory -continued     – Mouse
        • Wired
        • Wireless
    – Network
    – CPU Definitions for each of the table attributes may be utilized, for example, by extracting the definitions from the document in which the table is found. The table attributes are placed or mapped into one of the semantic categories of the ontology based on the definitions. The semantic categories for Table 1 include XXX, YYY, III, AAA, BBB, and DBA. The semantic categories for Table 2 include JJJ, XXX, YYY, III, DBA, AAA, BBB, and CCC.

The measurements of the tables may optionally be standardized 508. One unit of measure is identified for the tables and any measurements not conforming to that unit of measure are converted, thus standardizing or normalizing the measurements of Table 1 with the measurements of Table 2. For example, time periods may utilize months for service costs, and measurements in years are converted to months. In another example, hours may be utilized for disaster recovery times, and minutes are converted to hours. In another example, terabytes may be used to identify storage space, and measurements in gigabytes would be converted to terabytes.

A disambiguation algorithm or model may be applied to the table attributes 510 if needed. The disambiguation algorithm resolves differences between the table attributes when the attribute may not be clearly placed into a semantic category. For example, AAA may refer to any of an operating system, a software program, or a database. The disambiguation algorithm is typically associated with the domain that is associated with the semantic categories/ontology. Because AAA appears under the subheading DATABASE in Table 1, AAA is concluded to be in the semantic category Database.

The table attributes are converted into semantic vectors 512. The semantic vector for Table i is Semantic Vector (Table i):={Topic, table attributes, attribute semantic categories, attribute context}. The attribute context includes task-specific context constraints and weighting based on context requirements, e.g., service provider, supplier, software, services, third party, temporal constraints, spatial constraints, and so forth.

Examples of attribute context for Table 1 include hardware charge for XXX, YYY, and III, software charge for AAA, BBB SQL, and DBA/ABC, and temporal constraints are Year Avg. Examples of attribute context for Table 2 include hardware service for JJJJ, XXX, YYY, and III, software service for DBA Instances, AAA Instances, SQL Instances, and CCC Instances, and temporal constraints are Qty Yr.

Including information from the above analysis, an example of the semantic vector for Table 1 is Semantic Vector(Table 1):={Topic {Base Unit, Charges, Inventory}, table attributes {Mainframe, XXX/YYY Servers (Virtual), XXX/YYY Servers (Physical), III, III DASD, AAA, BBB SQL, and DBA/ABC, Unit of Measure, Year 1 Avg., Year 2 Avg., and Year 3 Avg., Definition(Mainframe), Definition(XXX/YYY Servers (Virtual)), Definition(XXX/YYY Servers (Physical)), Definition(III), Definition(III DASD), Definition(AAA), Definition(BBB SQL), Definition(DBA/ABC), Definition(Unit of Measure), Definition(Year 1 Avg.), Definition(Year 2 Avg.), and Definition(Year 3 Avg.)

}, attribute semantic categories{SemanticCategory(XXX), SemanticCategory(YYY), SemanticCategory(III), SemanticCategory(AAA), SemanticCategory(BBB), SemanticCategory(DBA)}, attribute context{Context(XXX): hardware service, Context(YYY): hardware charge, Context(III): hardware charge, Context(AAA): software charge, Context (BBB SQL): software charge, Context(DBA/ABC): software charge, Temporal Constraints: Year Avg.}}.

Including information from the above analysis, an example of the semantic vector for Table 2 is Semantic Vector(Table 2):={Topic {Service, Maintenance Costs}, table attributes {JJJ Server Images, XXX Server Images, YYY Server Images, III LPARS, Middleware Instances, DBA Instances, AAA Instances, SQL Instances, CCC Instances, Tier 0, Tier 1, Tier 2, Tier 3, Contract Start Qty Yr 1, Contract Start Qty Yr 2, Contract Start Qty Yr 3, Contract Start Qty Yr 4, and Contract Start Qty Yr 5, Definition(JJJ Server Images), Definition(XXX Server Images), Definition (YYY Server Images), Definition(III LPARS), Definition (Middleware Instances), Definition(DBA Instances), Definition(AAA Instances), Definition(SQL Instances), Definition(CCC Instances), Definition(Tier 0), Definition (Tier 1), Definition(Tier 2), Definition(Tier 3), Definition (Contract Start Qty Yr 1), Definition(Contract Start Qty Yr 2), Definition(Contract Start Qty Yr 3), Definition(Contract Start Qty Yr 4), and Definition(Contract Start Qty Yr 5)}, attribute semantic categories IS emanticCategory(JJJ), SemanticCategory(XXX), SemanticCategory(YYY), SemanticCategory(III), SemanticCategory(DBA), SemanticCategory(AAA), SemanticCategory(BBB), SemanticCategory(CCC)}, attribute context {Context(JJJ): hardware service, Context(XXX): hardware service, Context(YYY): hardware service, Context(III): hardware service, Context (DBA Instances): software service, Context(AAA Instances): software service, Context(SQL Instances): software service, Context(CCC Instances): software service, Temporal Constraints: Qty Yr}}}.

The semantic vectors are compared to identify related data between the tables 514, such as rows or columns. For example, an IBM Watson® computing system may be utilized to perform the comparison 514. The semantic vectors may be compared by calculating:

Similarity (Table 1, Table 2)=Cosine(Vector(Table 1), Vector(Table 2)), where Vector is the Semantic Vector. The Cosine calculation is also known as the Cosine similarity calculation. In order to fill in the Semantic Vector values in the above Similarity calculation, the following calculation may be utilized:

Weight (fi)=CatWeight(fi)*Freq(fi)/SectionFreq(fi), where Weight(fi) is the weight of the ith feature in the vector; CatWeight(fi) measures the importance of each semantic feature category, e.g., topic, table attributes, attribute semantic categories, attribute context; Freq(fi) is the frequency of fi in the document, for example, the number of occurrences of fi in the document divided by the total number of occurrences of all the semantic features in the document; and SectionFreq(fi) is the frequency of fi in the section of the document under consideration, for example, the number occurrences of fi in the current section being analyzed divided by the total number of occurrences of fi in all the sections, e.g., the whole document. For example, when "Base Unit" is the semantic feature, CatWeight(Topic)=0.5, Freq(Base Unit)=0.3, and SectionFreq(Base Unit)=0.44, then Weight(Base Unit)=CatWeight(Topic)*Freq(Base Unit)/SectionFreq(Base Unit)=0.5*0.3/0.44=0.34. In another example, when "charges" is the semantic feature, CatWeight(Topic)=0.5, Freq(charges)=0.64, and SectionFreq(charges)=0.8, then Weight(charges)=CatWeight (Topic)*Freq(charges)/S ectionFreq(charges)=0.5*0.64/ 0.8=0.4. In another example, when "Inventory" is the semantic feature, CatWeight(Topic)=0.5, Freq(Inventory) =0.8, and SectionFreq(Inventory)=0.51, then Weight(Inventory)=CatWeight(Topic)*Freq(Inventory)/SectionFreq(Inventory)=0.5*0.8/0.51=0.78. In another example, when "Inventory" is the semantic feature, CatWeight(Topic)=0.5, Freq(Service)=0.57, and SectionFreq(Service)=0.37, then Weight(Service)=CatWeight(Topic)*Freq(Service)/S ectionFreq(Service)=0.5*0.57/0.37=0.77. In another example, when "Maintenance Costs" is the semantic feature, CatWeight(Topic)=0.5, Freq(Maintenance Costs)=0.57, and SectionFreq(Maintenance Costs)=0.33, then Weight(Maintenance Costs)=CatWeight(Topic)*Freq(Maintenance Costs)/SectionFreq(Maintenance Costs)=0.5*0.57/ 0.33=0.77. With the results of the above examples, Semantic Vector(Table 1)={Topic {Base Unit:0.34, Charges:0.40, Inventory: 0.78}, . . . } and Semantic Vector(Table 2)={Topic {Service:0.77, Maintenance Costs: 0.64}, . . . }. Similarity (Table 1, Table 2)=Cosine(Vector(Table 1), Vector(Table 2))=Cosine({Topic {Base Unit:0.34, Charges: 0.40, Inventory: 0.78}, . . . }, {Topic {Service:0.77, Maintenance Costs: 0.64}_1). For the above example, Vector (Table 1)={Topic {x1: Base Unit:0.34, x2:Charges:0.40, x3: Inventory:0.78, x4: Service:0, x5: Maintenance Cost: 0, . . . }, . . . } and Vector(Table 2)={Topic{y1: Base Unit:0, y2:Charges:0, y3: Inventory:0, y4:Service:0.77, y5:Maintenance Cost:0.78, . . . }, . . . }. In one example, the Similarity is calculated using the formula below:

$$\cos(\theta) = \left(\sum_{i=1}^{n}(x_i \times y_i)\right) / \left(\sqrt{\sum_{i=1}^{n}(x_i)^2} \times \sqrt{\sum_{i=1}^{n}(y_i)^2}\right).$$

The columns of Table 1 that have the highest semantic similarities to the columns of Table 2 are related columns. The comparison of semantic vectors revealed no related columns between Table 1 and Table 2. The rows of Table 1 that have the highest semantic similarities to the rows of Table 2 are related rows. The results of the comparison of the semantic vectors for Table 1 and Table 2 show that row 304 of Table 1 is related to row 404 and row 406 of Table 2. Row 306 and row 308 of Table 1 are related to row 408 of Table 2. Row 310 of Table 1 is related to row 412 of Table 2, row 312 of Table 1 is related to row 414 of Table 2, and Row 314 of Table 1 is related to row 410 of Table 2. The rows that are related between Table 1 and Table 2 are identified and provided 516 to the communication device 102 for display and/or storage.

The table comparison method described herein provides deep semantic association analysis by comparing semantic vectors. The semantic vectors may include table topics, table attributes, attribute semantic categories, attribute context, and so forth. Deep semantic analysis provides more accurate results than surface sequence similarity analysis. Latent semantic distribution and domain context association are combined. The deep semantic comparison utilizes context from the tables and the documents from which the tables are obtained. Semantic and context distribution differences among the tables are effectively found. Differences in layout structures and semantic attribute sequences among the tables are overcome.

According to one or more embodiments, a method comprises performing, by a data processing system, identifying a first topic for a first table and identifying a second topic for a second table, collecting at least one first table attribute comprising at least one row name for the first table, and collecting at least one second table attribute comprising at least one row name for the second table. The at least one first table attribute and the at least one second table attribute are placed in at least one semantic category. The at least one first table attribute is converted into at least one semantic vector for the first table, and the at least one second table attribute is converted into at least one semantic vector for the second table. The at least one semantic vector for the first table is compared with the at least one semantic vector for the second table to identify as related at least one row of the first table and at least one row of the second table that are provided to a communication device. The identifying may comprise performing semantic analysis of table headers, table title, and table text from the first table and the second table. The identifying may comprise performing semantic analysis of text referencing the first table and the second table. The at least one first table attribute may further comprise at least one column name for the first table. The at least one second table attribute may comprise at least one column name for the second table. The placing may comprise determining an ontology comprising a plurality of semantic categories. The method may further comprise standardizing, by a data processing system, measurements of the first table with measurements of the second table. The method may further comprise applying, by a data processing system, a disambiguation algorithm associated to the at least one first table attribute and the at least one second table attribute, wherein the disambiguation algorithm is associated with a domain that is associated with the at least one semantic category. Each semantic vector for the first table may comprise the first table topic, the at least one first table attribute, the at least one semantic category for the first table, and at least one attribute context for the first table.

According to one or more embodiments, a method comprises identifying a first topic for a first table and identifying a second topic for a second table, collecting, by a data processing system, at least one first table attribute comprising at least one row name for the first table, and collecting, by a data processing system, at least one second table attribute comprising at least one row name for the second table. The at least one first table attribute and the at least one second table attribute are placed in at least one semantic category by a data processing system. The at least one first table attribute is converted, by a data processing system, into at least one semantic vector for the first table, and the at least one second table attribute is converted, by a data processing system, into at least one semantic vector for the second table. The at least one semantic vector for the first table is compared, by a data processing system, with the at least one semantic vector for the second table to identify as related at least one row of the first table and at least one row of the second table. The at least one row of the first table and the at least one row of the second table are provided to a communication device with an identification as related. The at least one processor may be further arranged and constructed to identify a first topic for a first table and identify a second topic for a second table, wherein identifying comprises performing semantic analysis of table headers, table title, and table text from the first table and the second table. The at least one processor may be further arranged and constructed to identify a first topic for a first table and identify a second topic for a second table, wherein identifying comprises performing semantic analysis of text referencing the first table and the second table. The at least one processor may be further arranged and constructed to place the at least one first table attribute and the at least one second table attribute in at least one semantic category of an ontology, wherein the ontology comprises a plurality of semantic categories. The at least one processor may be further arranged and constructed to apply a disambiguation algorithm associated to the at least one first table attribute and the at least one second table attribute, wherein the disambiguation algorithm is associated with a domain that is associated with the at least one semantic category. Each semantic vector for the first table may comprise a first table topic, the at least one first table attribute, at least one semantic category for the first table, and at least one attribute context for the first table.

According to one or more embodiments, a computer program product for a table analysis system comprises a computer readable storage medium having program instructions embodied therein, wherein the program instructions are executable by a device to cause the device to: collect at least one first table attribute comprising at least one row name for a first table; collect at least one second table attribute comprising at least one row name for a second table; place the at least one first table attribute and the at least one second table attribute in at least one semantic category of an ontology comprising a plurality of semantic categories; convert the at least one first table attribute into at least one semantic vector for the first table and convert the at least one second table attribute into at least one semantic vector for the second table; compare the at least one semantic vector for the first table with the at least one semantic vector for the second table to identify as related at least one row of the first table and at least one row of the second table; and provide, to the communication device, the related at least one row of the first table and at least one row of the second table. The program instructions may be executable by a device to further cause the device to identify a first topic for a first table and identify a second topic for a second table, wherein identifying comprises performing semantic analysis of table headers, table title, and table text from the first table and the second table. The program instructions may be executable by a device to further cause the device to identify a first topic for a first table and identify a second topic for a second table, wherein identifying comprises performing semantic analysis of text referencing the first table and the second table. The program instructions may be executable by a device to further cause the device to apply a disambiguation algorithm associated to the at least one first table attribute and the at least one second table attribute, wherein the disambiguation algorithm is associated with a domain that is associated with the at least one semantic category. Each semantic vector for the first table may comprise a first table topic, the at least one first table attribute, the at least one semantic category for the first table, and at least one attribute context for the first table.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, the numeral references to the same or like components or steps.

The terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract is provided to allow a reader to quickly ascertain the nature of the technical disclosure. The Abstract is submitted with the understanding that the Abstract will not be used to interpret or limit the scope or meaning of the claims. In the foregoing Detailed Description, various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   identifying a first topic for a first table and identifying a second topic for a second table;
   collecting, by a data processing system, at least one first table attribute comprising at least one row name for the first table;
   collecting, by the data processing system, at least one second table attribute comprising at least one row name for the second table;
   placing, by the data processing system, the at least one first table attribute and the at least one second table attribute in at least one semantic category;
   converting, by the data processing system, the at least one first table attribute into at least one semantic vector for the first table and converting, by the data processing system, the at least one second table attribute into at least one semantic vector for the second table;
   comparing, by the data processing system, the at least one semantic vector for the first table with the at least one semantic vector for the second table to identify as related at least one row of the first table and at least one row of the second table; and
   providing, to a communication device, the at least one row of the first table and the at least one row of the second table with an identification as related, wherein:
   the comparison is based on a cosine similarity between the at least one semantic vector for the first table and the at least one semantic vector for the second table, and
   at least one feature of each semantic vector in the comparison is weighted based on an importance of a corresponding semantic category of a given feature multiplied by a frequency of the at least one feature and divided by a number of all semantic features of the semantic vector.

2. The method of claim 1, wherein identifying comprises performing semantic analysis of table headers, table title, and table text from the first table and the second table.

3. The method of claim 1, wherein identifying comprises performing semantic analysis of text referencing the first table and the second table.

4. The method of claim 1, wherein the at least one first table attribute further comprises at least one column name for the first table.

5. The method of claim 1, wherein the at least one second table attribute comprises at least one column name for the second table.

6. The method of claim 1, wherein placing comprises determining an ontology comprising a plurality of semantic categories.

7. The method of claim 1, further comprising standardizing, by a data processing system, measurements of the first table with measurements of the second table.

8. The method of claim 1, further comprising applying, by a data processing system, a disambiguation algorithm associated to the at least one first table attribute and the at least one second table attribute, wherein the disambiguation algorithm is associated with a domain that is associated with the at least one semantic category.

9. The method of claim 1, wherein each semantic vector for the first table comprises the first table topic, the at least one first table attribute, the at least one semantic category for the first table, and at least one attribute context for the first table.

10. A table analysis system comprising:
    a network adapter configured to receive, from a communication device, a table query and to communicate information associated with the table query to the communication device;
    at least one processor arranged and constructed to:
    collect at least one first table attribute comprising at least one row name for a first table;
    collect at least one second table attribute comprising at least one row name for a second table;
    convert the at least one first table attribute into at least one semantic vector for the first table and convert the at least one second table attribute into at least one semantic vector for the second table;
    compare the at least one semantic vector for the first table with the at least one semantic vector for the second table to identify as related at least one row of the first table and at least one row of the second table; and
    provide, to the communication device, the related at least one row of the first table and at least one row of the second table, wherein:
    the comparison is based on a cosine similarity between the at least one semantic vector for the first table and the at least one semantic vector for the second table, and
    at least one feature of each semantic vector in the comparison is weighted based on an importance of a corresponding semantic category of a given feature multiplied by a frequency of the at least one feature and divided by a number of all semantic features of the semantic vector.

11. The table analysis system of claim 10, wherein the at least one processor is further arranged and constructed to identify a first topic for a first table and identify a second topic for a second table, wherein identifying comprises performing semantic analysis of table headers, table title, and table text from the first table and the second table.

12. The table analysis system of claim 10, wherein the at least one processor is further arranged and constructed to identify a first topic for a first table and identify a second topic for a second table, wherein identifying comprises performing semantic analysis of text referencing the first table and the second table.

13. The table analysis system of claim 10, wherein the at least one processor is further arranged and constructed to place the at least one first table attribute and the at least one second table attribute in at least one semantic category of an ontology, wherein the ontology comprises a plurality of semantic categories.

14. The table analysis system of claim 10, wherein the at least one processor is further arranged and constructed to apply a disambiguation algorithm associated to the at least one first table attribute and the at least one second table attribute, wherein the disambiguation algorithm is associated with a domain that is associated with the at least one semantic category.

15. The table analysis system of claim 10, wherein each semantic vector for the first table comprises a first table topic, the at least one first table attribute, at least one semantic category for the first table, and at least one attribute context for the first table.

16. A computer program product for a table analysis system, the computer program product comprising a computer readable storage medium having program instructions embodied therein, wherein the program instructions are executable by a device to cause the device to:
collect at least one first table attribute comprising at least one row name for a first table;
collect at least one second table attribute comprising at least one row name for a second table;
place the at least one first table attribute and the at least one second table attribute in at least one semantic category of an ontology comprising a plurality of semantic categories;
convert the at least one first table attribute into at least one semantic vector for the first table and convert the at least one second table attribute into at least one semantic vector for the second table;
compare the at least one semantic vector for the first table with the at least one semantic vector for the second table to identify as related at least one row of the first table and at least one row of the second table; and
provide, to the communication device, the related at least one row of the first table and at least one row of the second table, wherein:
the comparison is based on a cosine similarity between the at least one semantic vector for the first table and the at least one semantic vector for the second table, and
at least one feature of each semantic vector in the comparison is weighted based on an importance of a corresponding semantic category of a given feature multiplied by a frequency of the at least one feature and divided by a number of all semantic features of the semantic vector.

17. The computer program product of claim 16, wherein the program instructions are executable by a device to further cause the device to identify a first topic for a first table and identify a second topic for a second table, wherein identifying comprises performing semantic analysis of table headers, table title, and table text from the first table and the second table.

18. The computer program product of claim 16, wherein the program instructions are executable by a device to further cause the device to identify a first topic for a first table and identify a second topic for a second table, wherein identifying comprises performing semantic analysis of text referencing the first table and the second table.

19. The computer program product of claim 16, wherein the program instructions are executable by a device to further cause the device to apply a disambiguation algorithm associated to the at least one first table attribute and the at least one second table attribute, wherein the disambiguation algorithm is associated with a domain that is associated with the at least one semantic category.

20. The computer program product of claim 16, wherein each semantic vector for the first table comprises a first table topic, the at least one first table attribute, the at least one semantic category for the first table, and at least one attribute context for the first table.

* * * * *